(12) United States Patent
Kuo

(10) Patent No.: US 9,110,258 B2
(45) Date of Patent: Aug. 18, 2015

(54) OPTICAL FIBER COUPLING CONNECTOR

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/304,998

(22) Filed: Jun. 16, 2014

(65) Prior Publication Data

US 2014/0369652 A1    Dec. 18, 2014

(30) Foreign Application Priority Data

Jun. 14, 2013  (TW) .................................. 102121194

(51) Int. Cl.
  *G02B 6/42*  (2006.01)
(52) U.S. Cl.
  CPC ............ *G02B 6/4214* (2013.01); *G02B 6/4246* (2013.01); *G02B 6/4259* (2013.01)
(58) Field of Classification Search
  CPC .............. G02B 6/4202–6/4203; G02B 6/4214; G02B 6/4219; G02B 6/36
  USPC ............................... 385/93, 88, 89, 76, 47, 35
  See application file for complete search history.

(56) References Cited

U.S. PATENT DOCUMENTS

| 2011/0188817 A1* | 8/2011 | Chang et al. ..................... 385/89 |
| 2014/0126864 A1* | 5/2014 | Suzuki et al. ..................... 385/93 |
| 2014/0301703 A1* | 10/2014 | Huang et al. ..................... 385/89 |

* cited by examiner

*Primary Examiner* — Mark Robinson
*Assistant Examiner* — Eftihia Barnes
(74) *Attorney, Agent, or Firm* — Novak Druce Connolly Bove + Quigg LLP

(57) ABSTRACT

An optical fiber coupling connector includes a circuit board, light-emitting modules, light-receiving modules, an optical coupling module, a receiving member, and optical fibers. The optical coupling module includes a main body and converging lenses. The main body has a first optical surface, a second optical surface perpendicular to the first optical surface, and a reflection surface oblique relative to the first and second optical surfaces. The converging lenses are formed on the first optical surface and are aligned with the light-emitting modules and the light-receiving modules. The receiving member includes a front end portion and a rear end portion at opposite sides and defines through holes extending from the front end portion to the rear end portion. The receiving member is coupled with the main body, and the front end portion faces the second optical surface. The optical fibers are received in the through holes.

7 Claims, 5 Drawing Sheets

OPTICAL FIBER COUPLING CONNECTOR

FIELD

The subject matter herein generally relates to an optical fiber coupling connector.

BACKGROUND

Optical fiber coupling connectors have been widely used as interfaces for high-speed transmission of electronic data between a computer host and a computer peripheral apparatus, such as a scanner, a digital camera, a mobile phone, a music player, etc. The optical fiber coupling connector includes a number of light-emitting modules, light-receiving modules, optical fibers corresponding to the light-emitting modules and the light-receiving modules, and an optical coupling module. The light-emitting modules are optically coupled with the corresponding optical fibers via the optical coupling module, and the light-receiving modules are optically coupled with the corresponding optical fibers via the optical coupling module.

BRIEF DESCRIPTION OF THE DRAWINGS

Implementations of the present technology will now be described, by way of example only, with reference to the attached figures, wherein.

DETAILED DESCRIPTION

Figure 1:
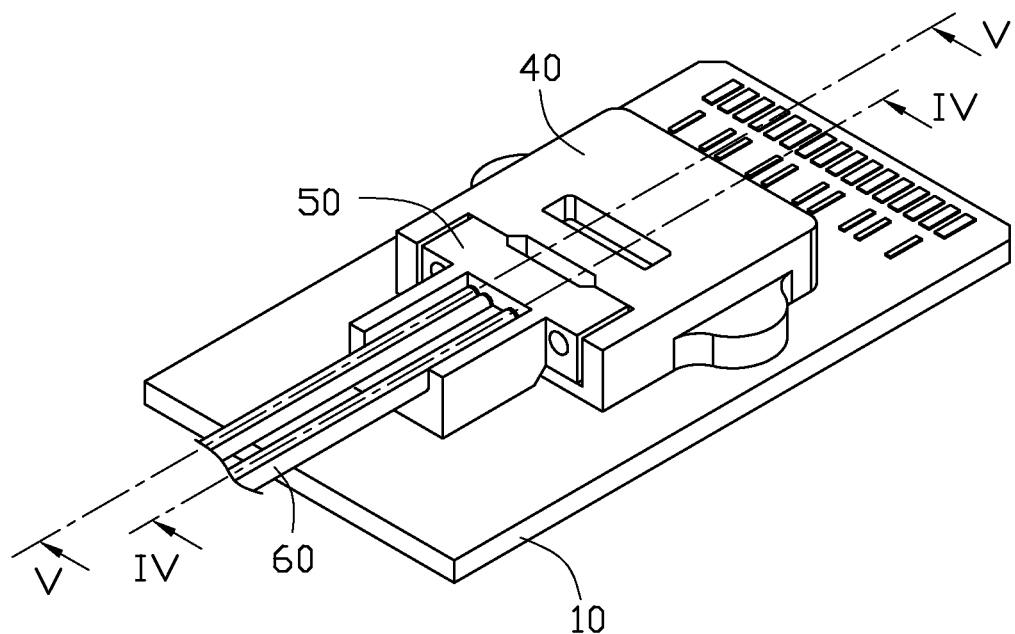
FIG. 1 is an isometric view of an example embodiment of an optical fiber coupling connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like. The references "a plurality of" and "a number of" mean "at least two."

The present disclosure is described in relation to an optical fiber coupling connector. The optical fiber coupling connector includes a circuit board, a number of light-emitting modules, a number of light-receiving modules, an optical coupling module, a receiving member, and a number of optical fibers. The light-emitting modules and the light-receiving modules are mounted on the circuit board and are spaced apart from each other. The optical coupling module includes a main body positioned above the circuit board and a number of converging lenses. The main body includes a first optical surface, a second optical surface perpendicular to the first optical surface, and a reflection surface oblique relative to the first optical surface and the second optical surface. The converging lenses are formed on the first optical surface and are aligned with the light-emitting modules and the light-receiving modules. The receiving member includes a front end portion and a rear end portion at opposite sides and defines a number of through holes extending from the front end portion to the rear end portion. The receiving member is coupled with the main body. The front end portion faces the second optical surface. Each optical fiber has a body portion and an optical lens formed at the distal end of the body portion. The body portions are received in the through holes. The optical lenses protrude from the through holes and correspond to the converging lenses. The reflection surface is configured for reflecting parallel light beams from the light-emitting modules toward the optical lenses and for reflecting parallel light beams from the optical lenses toward the light-receiving modules.

Figure 2:
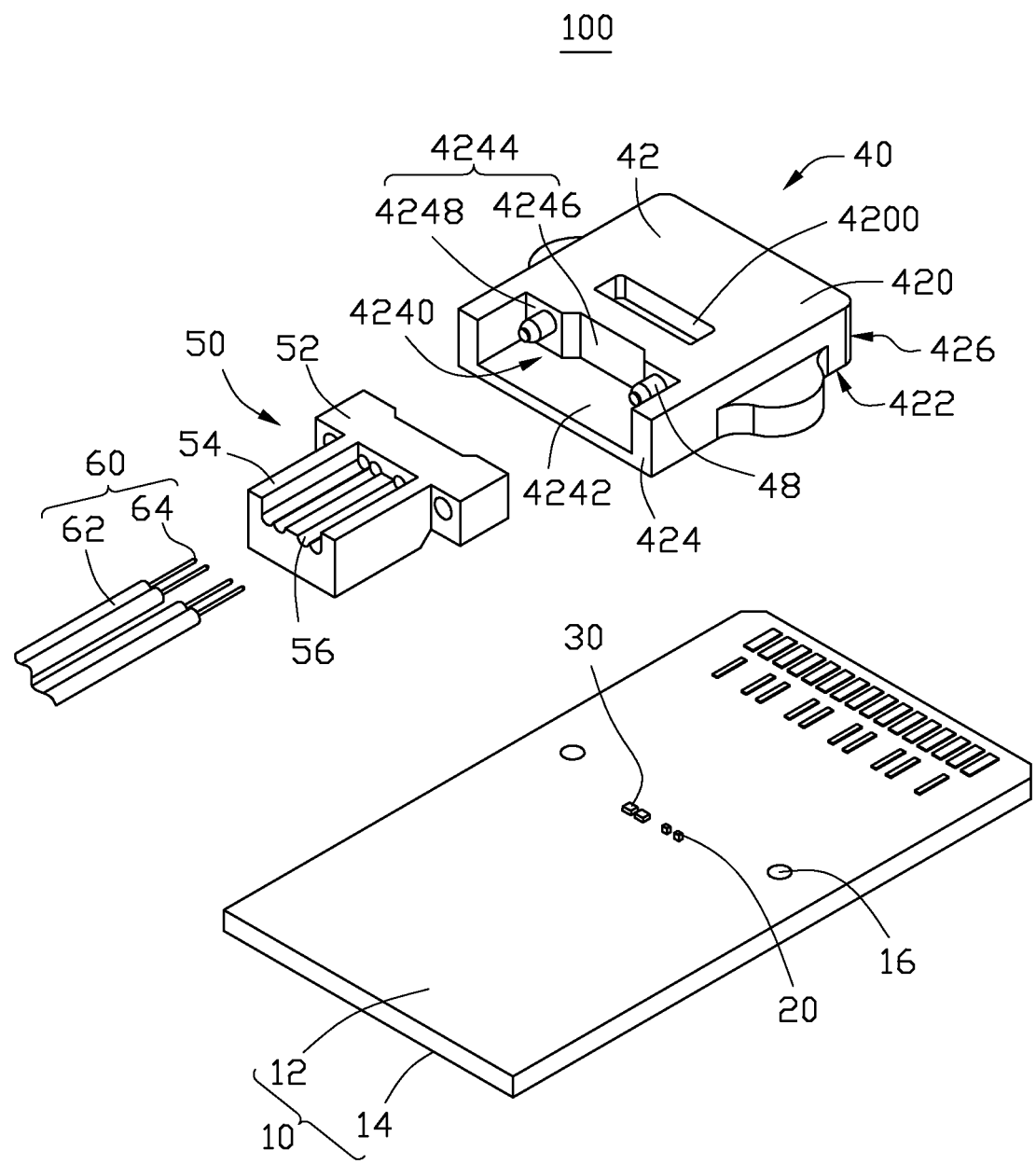
FIG. 2 is an exploded view of the optical fiber coupling connector of FIG. 1.

FIGS. 1 and 2 illustrate an embodiment of an optical fiber coupling connector 100. The optical fiber coupling connector 100 includes a circuit board 10, two light-emitting modules 20, two light-receiving modules 30, an optical coupling module 40, a receiving member 50, and four optical fibers 60.

The circuit board 10 includes an upper surface 12 and a lower surface 14. The upper surface 12 and the lower surface 14 are positioned at opposite sides of the circuit board 10. The upper surface 12 is substantially parallel to the lower surface 14. Two engagement holes 16 are defined in the circuit board 10. Each of the engagement holes 16 can be a cylindrical through hole and extend from the upper surface 12 to the lower surface 14.

The light-emitting modules 20 and the light-receiving modules 30 are mounted on the first upper surface 12 and are electrically connected to the circuit board 10. In detail, the light-emitting modules 20 and the light-receiving modules 30 are arranged in a straight line and are spaced from each other. That is, centers of the light-emitting modules 20 and of light-receiving modules 30 are arranged in a straight line. In this embodiment, each of the light-emitting modules 20 is a vertical cavity surface emitting laser (VCSEL) diode and is configured for converting electric signals to optical signals and emitting light. Each of the light-receiving modules 30 is a photo diode and is configured for receiving light and converting optical signals to electric signals.

Figure 3:
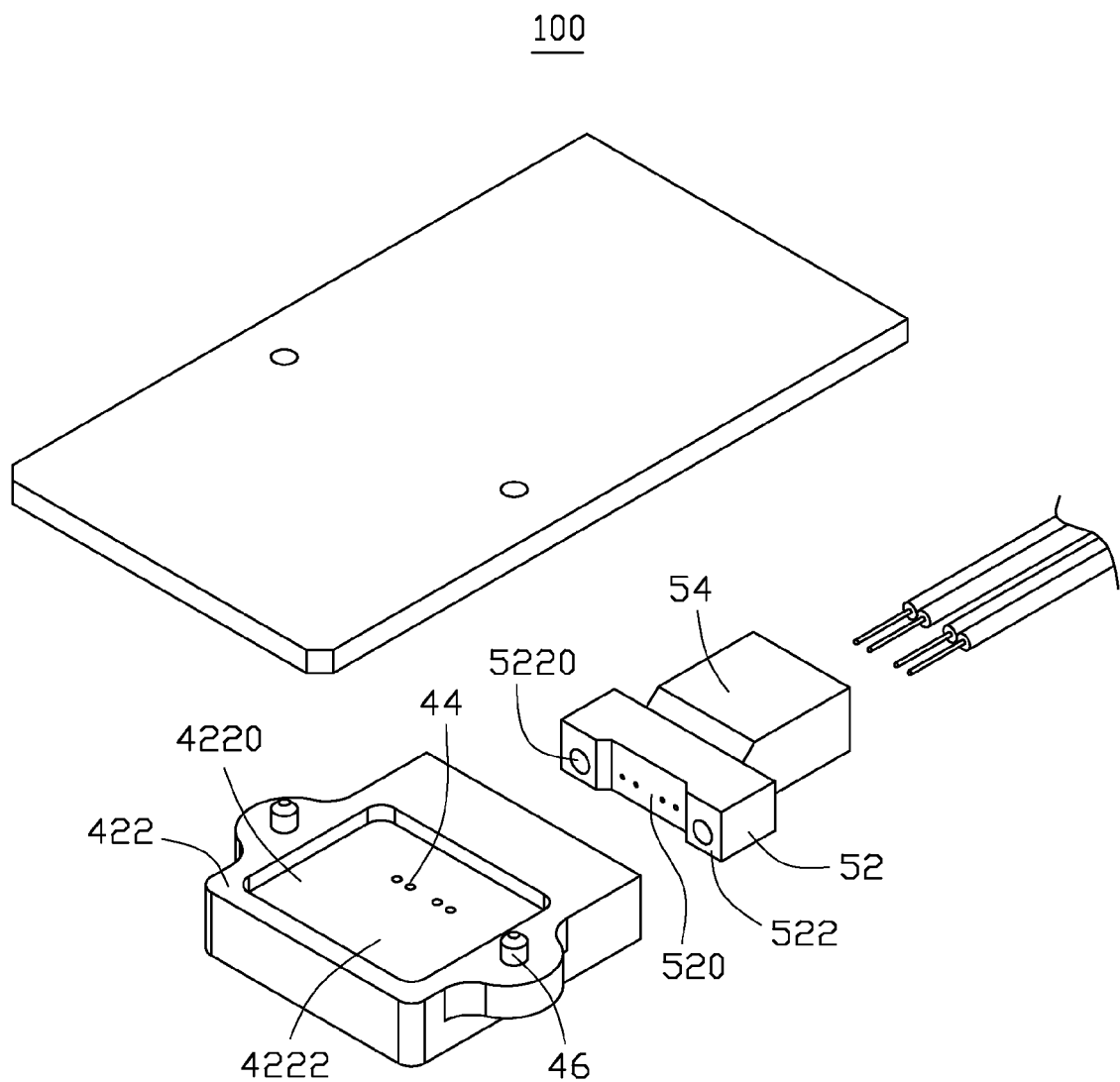
FIG. 3 is similar to FIG. 2, but viewed from another angle.
Figure 4:
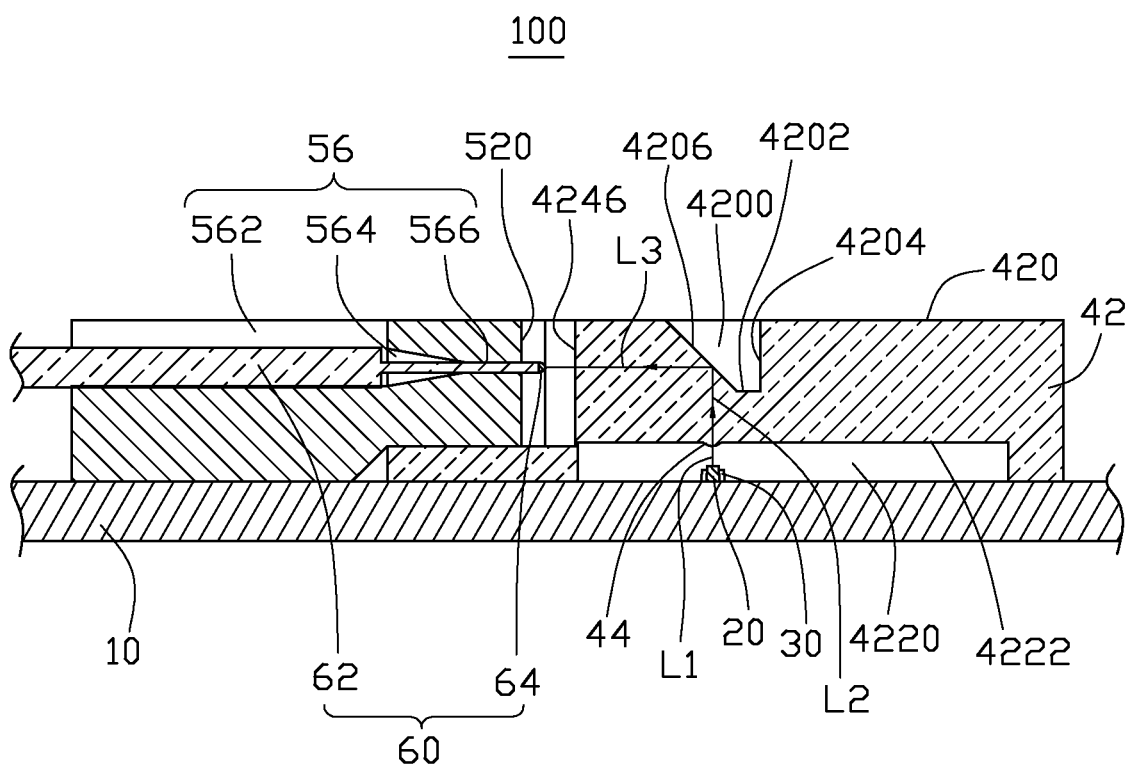
FIG. 4 is a cross-sectional view taken along line IV-IV of the optical fiber coupling connector of FIG. 1.

FIGS. 2-4 illustrate the optical coupling module 40. The optical coupling module 40 includes a main body 42, four converging lenses 44, two posts 46, and two plugs 48.

The main body 42 includes a top surface 420, a bottom surface 422, a front surface 424, and a rear surface 426. The top surface 420 and the bottom surface 422 are positioned at opposite sides of the main body 42, and the top surface 420 is substantially parallel to the bottom surface 422. The front surface 424 and the rear surface 426 are positioned at opposite sides of the main body 42, and the front surface 424 is substantially parallel to the rear surface 426.

The top surface 420 defines an elongated top recess 4200. The main body 42 further includes a first inner surface 4202, a second inner surface 4204, and a reflection surface 4206 in the top recess 4200. The first inner surface 4202 is positioned at the bottom of the top recess 4200, and is substantially parallel to the top surface 420. The second inner surface 4204 is positioned at a side of the top recess 4200, and is perpendicularly interconnected between the first inner surface 4202 and the top surface 420. The reflection surface 4206 is positioned at a side of the top recess 4200 opposite to the second inner surface 4204, and is obliquely interconnected between the first inner surface 4202 and the top surface 420.

The bottom surface 422 defines a rectangular bottom recess 4220. The main body 42 further includes a first optical surface 4222 at the bottom of the bottom recess 4220. The first optical surface 4222 is substantially parallel to the top surface 420 and the bottom surface 422.

The front surface 424 defines a cutout 4240. The main body 42 further includes a supporting surface 4242 and a stepped portion 4244 in the cutout 4240. The supporting surface 4242 is positioned at the bottom of the cutout 4240 and is substantially parallel to the top surface 420. The stepped portion 4244 perpendicularly extends from the supporting surface 4242 and includes a second optical surface 4246 and two mounting surfaces 4248. The second optical surface 4246 is substantially parallel to the front surface 424. The mounting surfaces 4248 are located at opposite sides of the second optical surface 4246. The mounting surfaces 4248 are coplanar with each other and are substantially parallel to the front surface 424. The second optical surface 4246 is recessed relative to the two mounting surfaces 4248. In this embodiment, an included angle between a main plane of the first optical surface 4222 and a main plane of the reflection surface 4206 is about 45 degrees, and an included angle between a main plane of the second optical surface 4246 and a main plane of the reflection surface 4206 is about 45 degrees.

The four converging lenses 44 are formed on the first optical surface 4222 and are arranged in a straight line. The four converging lenses 44 face the reflection surface 4206. In this embodiment, the four converging lenses 44 and the main body 42 are formed into a unitary unit. The two posts 46 perpendicularly extend from the bottom surface 422 and correspond to the two engagement holes 16. The two plugs 48 perpendicularly extend from the two mounting surfaces 4248, respectively. In this embodiment, each of the converging lenses 44 is a convex lens.

The receiving member 50 includes a front end portion 52 and a rear end portion 54. The front end portion 52 and the rear end portion 54 are positioned at opposite ends of receiving member 50. The front end portion 52 includes an optical coupling surface 520 and two fixing surfaces 522. The fixing surfaces 522 are positioned at opposite sides of the optical coupling surface 520. The two fixing surfaces 522 are coplanar with each other. Each of the fixing surfaces 522 defines a fixing hole 5220 corresponding to the plugs 48. The optical coupling surface 520 is recessed relative to the two fixing surfaces 522. The receiving member 50 defines four through holes 56 extending from the optical coupling surface 520 and the rear end portion 54. The through holes 56 correspond to the optical fibers 60 and the converging lenses 44. In detail, the through holes 56 are arranged side by side at equal intervals along a same imaginary plane, with centers of the through holes 56 coinciding with the imaginary plane. Each of the through holes 56 includes a first through hole portion 562, a second through hole portion 564, and a third through hole 566 arranged in that order from the rear end portion 54 to the front end portion 52. The first through hole portion 562 can be substantially hemi-cylindrical. The second through hole portion 564 can be substantially conical. The third through hole portion 566 can be substantially cylindrical.

Each optical fiber 60 includes a body portion 62 and an optical lens 64. The optical lens 64 is formed on a distal end of the body portion 62. The optical fibers 60 are received in the respective through holes 56, and the optical lenses 64 protrude from the respective through holes 56.

When the optical coupling connector 100 is assembled, the two posts 46 engage in the two engagement holes 16 thereby fixing the optical coupling module 40 to the circuit board 10. In this situation, the light-emitting modules 20 and the light-receiving modules 30 are received in the bottom recess 4220 and are aligned with the four converging lenses 44. The two plugs 48 plug in the two fixing holes 5220 thereby fixing the receiving member 50 to the optical coupling module 40. In this situation, the receiving member 50 is supported by the supporting surface 4242. The two fixing surfaces 522 abut the two mounting surfaces 4248, respectively. The optical coupling surface 520 faces the second optical surface 4246.

FIG. 4 illustrates that when the optical coupling connector 100 is in use, electrical power is applied to the light-emitting modules 20 and the light-receiving modules 30 through the circuit board 10. Thus, light beams L1 emitted from each of the light-emitting modules 20 are converged by the corresponding converging lenses 44 to become parallel light beams L2. The parallel light beams L2 are reflected toward the second optical surface 4246 by the reflection surface 4206 and become parallel light beams L3. The parallel light beams L3 are converged to the corresponding body portion 62 through the corresponding optical lens 64.

Figure 5:
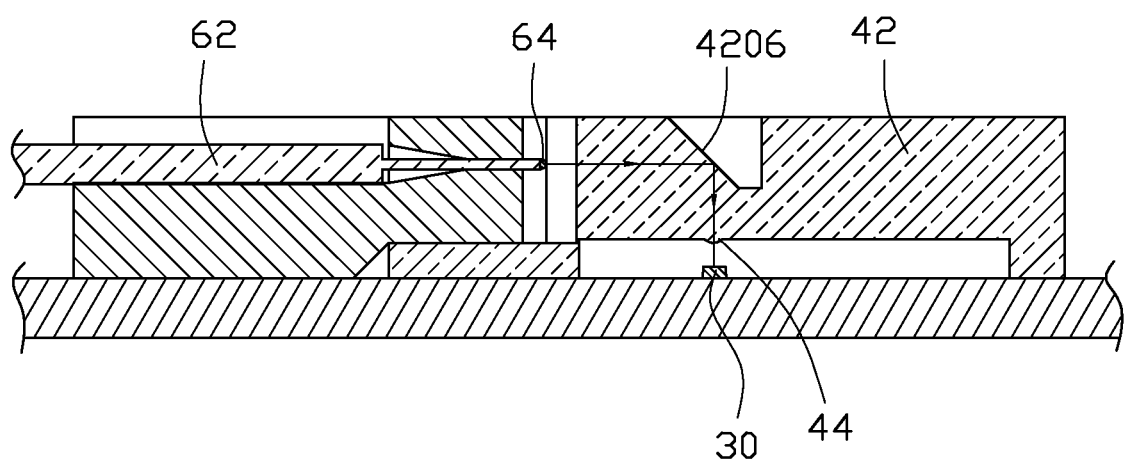
FIG. 5 is a cross-sectional view taken along line V-V of the optical fiber coupling connector of FIG. 1.

Accordingly, FIG. 5 illustrates that light beams from the body portion 62 become parallel light beams after passing the optical lenses 64 and entering the main body 42. The parallel light beams are reflected by the reflection surface 4206 toward the converging lenses 44 and finally enter the light-receiving modules 30.

The embodiments shown and described above are only examples. Many details are often found in the art such as the other features of an optical fiber coupling connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber coupling connector comprising:
   a circuit board;
   a plurality of light-emitting modules mounted on the circuit board;
   a plurality of light-receiving modules mounted separately from the light-emitting modules on the circuit board;
   an optical coupling module comprising a main body positioned above the circuit board and a plurality of converging lenses, the main body comprising a first optical surface, a second optical surface perpendicular to the first optical surface, and a reflection surface oblique relative to the first optical surface and the second optical surface, the converging lenses formed on the first optical surface and aligned with the light-emitting modules and the light-receiving modules;

a receiving member coupled with the main body and comprising a front end portion and a rear end portion at opposite sides thereof, oppositely facing each other and defining a plurality of through holes extending from the front end portion to the rear end portion; and a plurality of optical fibers each having a body portion with a distal end and an optical lens formed therein, the body portions received in the through holes, the optical lenses protruding from the through holes and corresponding to the converging lenses;

wherein the reflection surface is configured to reflect parallel light beams from the light-emitting modules toward the optical lenses and configured to reflect parallel light beams from the optical lenses toward the light-receiving modules;

wherein the optical coupling module further comprises two plugs, the main body further comprises a front surface and a rear surface opposite to the front surface, the front surface defines a cutout, the main body further comprises a supporting surface and a stepped portion in the cutout, the stepped portion extends from the supporting surface and comprises the second optical surface and two mounting surfaces arranged at opposite sides of the second optical surface, the second optical surface recessed relative to the mounting surfaces, the front end portion comprises an optical coupling surface and two fixing surfaces arranged at opposite sides of the optical coupling surface, the optical coupling surface is recessed relative to the fixing surfaces, each of the fixing surfaces defines a fixing hole, the plugs plug in the fixing holes thereby fixing the receiving member to the optical coupling module, the receiving member is supported on the supporting surface, the mounting surfaces abut the fixing surfaces, and the optical coupling surface faces the second optical surface.

2. The optical fiber coupling connector of claim 1, wherein the optical coupling module further comprises two posts, the main body further comprises a top surface, a bottom surface opposite to the top surface, the bottom surface defines a bottom recess having the first optical surface at the bottom thereof, the posts extend from the bottom surface, the circuit board defines two engagement holes corresponding to the posts, the posts engage in the engagement holes, and the light-emitting modules and the light-receiving modules are received in the bottom recess.

3. The optical fiber coupling connector of claim 2, wherein the top surface defines an elongated top recess having a first inner surface parallel to the top surface, a second inner surface perpendicularly interconnected between the first inner surface and the top surface, and the reflection surface obliquely interconnected between the first inner surface and the top surface, the reflection surface and the second inner surface are located at opposite sides of first inner surface, and the reflection surface faces the converging lenses.

4. The optical fiber coupling connector of claim 3, wherein an included angle between a main plane of the first optical surface and a main plane of the reflection surface is about 45 degrees, and an included angle between a main plane of the second optical surface and a main plane of the reflection surface is about 45 degrees.

5. The optical fiber coupling connector of claim 1, wherein the light-emitting modules and the light-receiving modules are arranged in a straight line, and the converging lenses are arranged in a straight line.

6. The optical fiber coupling connector of claim 1, wherein each of the through holes comprises a first through hole portion, a second through hole portion, and a third through hole arranged in that order from the rear end portion to the front end portion, the first through hole portion is substantially hemi-cylindrical, the second through hole portion is substantially conical, and the third through hole portion is substantially cylindrical.

7. The optical fiber coupling connector of claim 1, wherein the main body and the converging lenses are formed into a unitary unit.

* * * * *